O. LUNDGREN.
HARROW.
APPLICATION FILED JUNE 10, 1914.
1,151,888.
Patented Aug. 31, 1915.
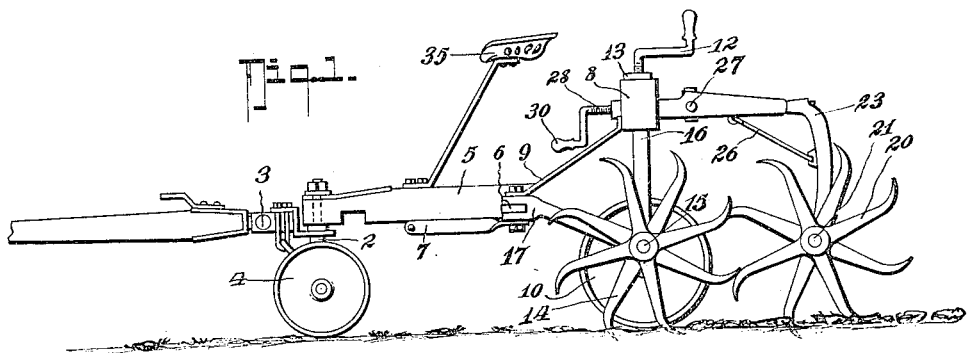
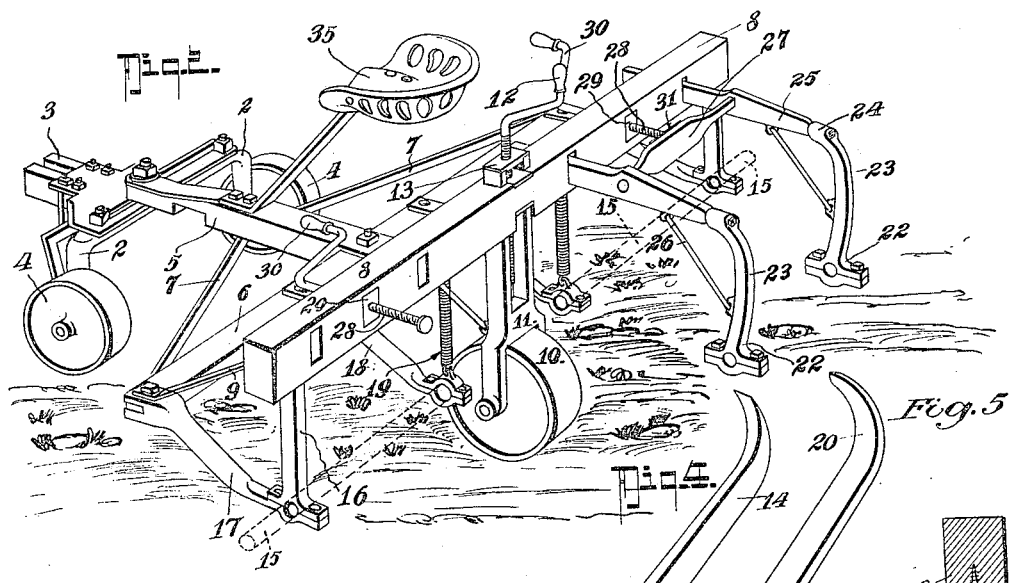
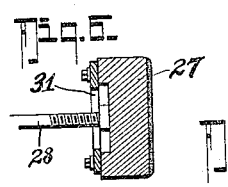
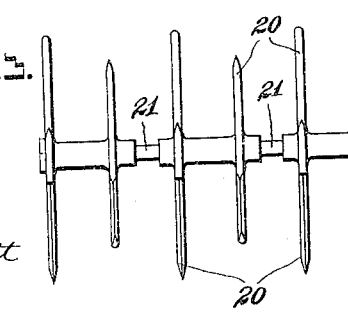
WITNESSES:
Charles J. Diller
John S. Schrott
INVENTOR
Ole Lundgren.
BY Fred G. Dieterich Co.
ATTORNEYS.

UNITED STATES PATENT OFFICE.

OLE LUNDGREN, OF GLEN VALLEY, BRITISH COLUMBIA, CANADA.

HARROW.

1,151,888.  Specification of Letters Patent.  Patented Aug. 31, 1915.

Application filed June 10, 1914. Serial No. 844,269.

*To all whom it may concern:*

Be it known that I, OLE LUNDGREN, a citizen of the Dominion of Canada, residing at Glen Valley, in the Province of British Columbia, Canada, have invented certain new and useful Improvements in Harrows, of which the following is a specification.

This invention relates to an improved harrow which has been particularly designed to break up the surface of the soil after plowing into a fine tilth, performing on the soil the services of a disk harrow and a scratch harrow. This is attained by providing, connected to a suitable frame, a leading and a following row of rotatable harrow teeth, the teeth of the leading one being designed to penetrate and break up the soil and to lift upward at back any clods or turf which it cannot break, which turf is cut by the teeth of the after harrow which interproject with those of the leading one, and are formed with a cutting edge to perform the service required.

The invention also comprises the manner of supporting from the ground the frame which carries these revoluble harrow teeth so that the depth to which the teeth penetrate the soil may be regulated, as also may be the distance of the after harrow from the leading one. The shafts which carry both rows of harrows are flexibly supported by the harrow frame so that they may adapt themselves to an irregular ground surface.

The invention is particularly described in the following specification, reference being made to the drawings by which it is accompanied, in which:

Figure 1 is a side elevation of the harrow. Fig. 2, a perspective view of the harrow frame and its wheels, a portion of the frame toward the near side being removed. Fig. 3 is a plan of one of the sets of the harrow teeth on their shaft, Figs. 4 and 5 show the ends of the harrow teeth of the leading and after harrows in cross section and perspective, and Fig. 6 is an enlarged detail in vertical cross section of the attachment of the adjusting screws to the after harrow frame by which the distance of the after harrow is varied from the leading harrow. Fig. 7 is a detail view showing the pivotal connection of the struts 18 with the cross timber 6.

In these drawings 2 represents a front frame to which the draft of the machine is connected at 3, which frame is supported on two wheels 4. From the center of this frame 2 backwardly extends a reach member 5 which at the after end is connected to a cross timber 6, the ends of which are connected by braces 7 to the reach 5. Behind and above this cross timber 6 a stout cross timber 8 is carried by a series of angular braces 9 from the cross rail 6 and at the middle by the frame 11 of a bull wheel 10. The two side members of this frame 11 are vertically movable through the cross timber 8 and adjustable in such slidable movement by a screw 12 threaded through a cap plate 13, which screw is provided with a crank handle and at the lower end is rotatably connected to the wheel carrying frame 11.

The harrow teeth 14 are formed as radiating in groups of four or more from a common center and equidistant from one another, the end of each tooth being bent in the direction of movement of rotation to an extent that will enable it to penetrate the soil at approximately a right angle as the harrow is drawn over the ground. The leading harrow consists of two shafts 15 in substantially axial alinement, on which shafts a series of these groups of teeth 14 are secured, the teeth of one group spaced between those of the next adjacent. Each shaft 15 with its radiating teeth 14 secured on it is carried at the outer end in a bearing formed in the end of a rigid strut 16 secured to and downwardly projecting from each end of the cross timber 8 and the lower end of this downwardly projecting strut is supported from the cross timber 6 by a strut 17 secured to each end of the cross timber 6, which strut forms the cap or underside of the shaft bearing. The inner end of each shaft 15 is supported in a bearing carried by an angled strut 18 pivotally connected to the cross member 6 and a spring 16 which connects it in a vertical line to the cross timber 8. This permits the leading harrow to accommodate itself to inequalities in the surface of the ground.

The teeth 20 of the after harrow are similar to those of the leading one between which those of the after one are spaced. They are secured on two shafts 21 which are substantially in axial alinement. The bearings 22 of these shafts are in the lower ends of members 23 which are loosely connected at 24 to the ends of members 25 endwise movable loosely through apertures provided for them in the cross timber 8. The members 23 and 25 are maintained substantially at right angles to one another by diagonal braces 26 between them. Those of each shaft 21 are connected together by a yoke 27 and are adjustable in their distance from the leading harrow by a screw 28 threaded through a nut 29 secured to the cross timber 8 and provided with a crank handle 30. Each screw 28 is connected to the yoke by a collar secured on the end of the screw, which collar is behind a plate 31 which has a vertically elongated aperture that will allow up and down movement of the frame 23, 25, 27 without disturbing the screw 28. The ends of the teeth of this after harrow are curved similarly to those of the leading harrow but their leading edges are sharpened to a turf cutting angle, so that as they pass downward between the blunt teeth of the front harrow moving upward, they will cut any clods or turf which may be lifted up by the teeth of the leading harrow. The seat of the driver 35 is secured on the reach member 5.

The frame of the harrow, which is vertically supported on the three wheels, the two leading wheels 4 and the bull wheel 10, and the depth to which the teeth of the harrows may penetrate the soil is regulated by adjustment of the bull wheel by means of the screw 21. In very hard ground the bull wheel may be lifted clear and the harrow teeth allowed to penetrate as far as they will under the weight of the after part of the harrow; or in moving along a road the harrows may be lifted clear. The action of the revolving teeth is to penetrate, break up and thoroughly stir the soil which it passes over and when a clod or lump of earth is encountered which will not break up under this action it is lifted and cut by the interprojected teeth of the after one.

Although the teeth of both the leading and after harrow are rigidly fixed in relation to one another on their shafts, the fact that each is in two lengths and that they are free, to a limited extent, to adapt themselves to irregularity in the surface of the ground is an advantageous feature of construction.

Having now particularly described my invention, I hereby declare that what I claim as new and desire to be protected in by Letters Patent, is:

1. A harrow, comprising the combination with a suitable frame supported on wheels, of a leading harrow comprising groups of teeth radiating at equal angles from a common center which groups are secured at intervals apart on two shafts which are supported in substantial axial alinement in bearings one of which is rigidly supported from the harrow frame and the other yieldingly supported therefrom, an after harrow comprising similar groups of teeth secured to two shafts in substantial axial alinement which shafts are yieldingly supported in bearings which are adjustable to and from those of the leading harrow, and means for regulating the depth to which the teeth of both harrows may penetrate the soil.

2. A harrow, comprising the combination with a suitable frame supported on two leading wheels and a single rear bull wheel which after wheel is vertically adjustable in the frame, of a leading harrow composed of two shafts extending in substantial alinement with one another from the bull wheel and supported in bearings downwardly projected from the frame, each shaft having a series of groups of teeth which radiate at equal angles from a common center each tooth being bent forward in the direction of rotational movement, of an after harrow composed of groups of similar teeth secured on separate shafts which are in axial alinement with one another, each tooth being sharpened to a cutting edge toward the direction of rotational movement.

3. A harrow, comprising the combination with a suitable frame supported on two leading wheels and a single vertically adjustable bull wheel behind, of a leading harrow which is in approximate alinement with the bull wheel, said harrow composed of groups of teeth each radiating at equal angles from a common center each group of teeth secured at distances apart on shafts which extend on each side from the bull wheel, the outer end of each shaft being carried in a bearing which is rigidly connected to the harrow frame and the inner end of each shaft adjacent to the bull wheel supported in a bearing which is yieldingly supported to the harrow frame as regards vertical movement, an after harrow composed of similar groups of teeth which are sharpened on the edge toward the direction of movement, the teeth of the after harrow spaced between those of the leading harrow each shaft of the after harrow being yieldingly supported in the matter of vertical movement from the harrow frame, and means for adjustment of the after harrow from the leading harrow.

In testimony whereof I affix my signature in presence of two witnesses.

OLE LUNDGREN.

Witnesses:
 ROWLAND BRITTAIN,
 A. GEORGE HARVEY.